W. C. MITCHELL.
APPARATUS FOR HANDLING COKE AND SIMILAR LOOSE MATERIAL.
APPLICATION FILED OCT. 24, 1910.

1,013,676.

Patented Jan. 2, 1912.

WITNESSES

William C. Mitchell,
INVENTOR,

BY

ATTORNEY

W. C. MITCHELL.
APPARATUS FOR HANDLING COKE AND SIMILAR LOOSE MATERIAL.
APPLICATION FILED OCT. 24, 1910.

1,013,676.

Patented Jan. 2, 1912.

W. C. MITCHELL.
APPARATUS FOR HANDLING COKE AND SIMILAR LOOSE MATERIAL.
APPLICATION FILED OCT. 24, 1910.

1,013,676.

Patented Jan. 2, 1912.

W. C. MITCHELL.
APPARATUS FOR HANDLING COKE AND SIMILAR LOOSE MATERIAL.
APPLICATION FILED OCT. 24, 1910.

1,013,676.

Patented Jan. 2, 1912.

WITNESSES

William C. Mitchell, INVENTOR,

BY

ATTORNEY

UNITED STATES PATENT OFFICE.

WILLIAM C. MITCHELL, OF SYDNEY, NOVA SCOTIA, CANADA.

APPARATUS FOR HANDLING COKE AND SIMILAR LOOSE MATERIAL.

1,013,676.  Specification of Letters Patent.  Patented Jan. 2, 1912.

Application filed October 24, 1910. Serial No. 588,690.

*To all whom it may concern:*

Be it known that I, WILLIAM C. MITCHELL, a citizen of the United States, residing at Sydney, in the Province of Nova Scotia and Dominion of Canada, have invented a new and useful Apparatus for Handling Coke and Similar Loose Material, of which the following is a specification.

The invention relates to an apparatus for handling coke and similar loose material and for transferring the same from ovens and like receptacles to railroad cars, barges, canal boats, and similar means of transportation, and for loading it into the same.

The object of the present invention is to improve the construction of machines for handling coke and similar loose material, more especially that shown and described in a companion application, filed by me on or about Mar. 31, 1910, Serial No. 552,704, and to provide a simple and efficient machine of great strength and durability, adapted to coöperate with a whole line of ovens and to be readily transferred from one oven to another to receive successively charges of coke therefrom, and capable of enabling a charge of coke to be quickly carried to and deposited in a car or other receptacle.

A further object of the invention is to provide an automatically operable extension device, adapted to bridge the space between the apparatus and the car or other receptacle to prevent the material spilling at the sides of the car, and capable of automatically returning to its initial position within the apparatus after each dumping operation, so as to be out of the way of a locomotive, box cars, vessels, or other means of transportation, and adapted also, should any material remain on the extension device, to carry the same into the apparatus so as to be discharged at the next operation thereof, whereby loss of coke, or other material through the loading thereof will be effectually eliminated.

With these and other objects in view, the invention consists in the construction and novel combination of parts hereinafter fully described, illustrated in the accompanying drawings, and pointed out in the claims hereto appended; it being understod that various changes in the form, proportion, size and minor details of construction, within the scope of the claims, may be resorted to without departing from the spirit or sacrificing any of the advantages of the invention.

In the drawings.

Like numerals of reference designate corresponding parts in all the figures of the drawings.

In the embodiment of the invention illustrated in the accompanying drawings, the coke handling apparatus comprises in its construction a wheeled frame 1, designed to be constructed of any suitable material and consisting essentially of a bottom portion 2, sides 3 and an overhead top portion 4 supported by the sides. The bottom portion of the frame is equipped at opposite sides with suitable bearings 5, arranged in pairs and longitudinally alined and receiving short longitudinal shafts or axles 6, upon which are mounted flanged or grooved wheels 7, arranged to run on rails 8 of a track, and adapted to permit lateral movement of the apparatus to transfer it from one coke oven 9 to another, whereby the apparatus is adapted to coöperate with and empty the charges of an entire series of coke ovens.

The shafts or axles 6 at one side of the apparatus have keyed or otherwise fixed to them gear wheels 10, meshing with pinions 11 of a longitudinal shaft 12, journaled in suitable bearings 13 of the frame and extending from the inner wheel to the outer wheel and equipped at an intermediate point with a gear wheel 14, meshing with a pinion 15 of a relatively short counter-shaft 16. The counter-shaft 16, which is located at the inner side of the longitudinal shaft 12, is journaled in suitable bearings 17, and it carries a gear wheel 18, which meshes with a pinion 19 of the shaft of a motor 20. The motor 20 is preferably an electric motor, but any other suitable power may be employed for moving the apparatus along its track. When the motor is started motion is communicated therefrom through the spur gearing to the wheels at that side of the apparatus, and the latter will be moved laterally in one direction or the other according to the direction of the rotation of the gear actuated wheels.

The wheeled frame carries a platform 21, constructed of plates of heavy sheet metal, such as boiler iron, or other suitable material, and extending from the inner or rear end of the apparatus to the front or outer end thereof, and preferably arranged in the form of a chute or trough and comprising a central horizontal bottom portion 22 and inclined sides 23. The inclined sides 23 are provided at their upper edges with laterally extending horizontally disposed supporting flanges 24, fitted against the sides of the frame and preferably connected therewith by means of angle bars 25, the flanges are provided at their inner sides with upwardly projecting longitudinal ribs 26, and they form a guideway for supporting the lower flights 27 of endless sprocket chains 28, or other forms of endless belts. The angle bars 25 are arranged beneath the horizontal supporting flanges 24 and are secured to the same and to the sides of the frame, but the inclined sides of the platform may be connected at their upper edges with the sides of the frame in any other preferred manner.

Figure 7:
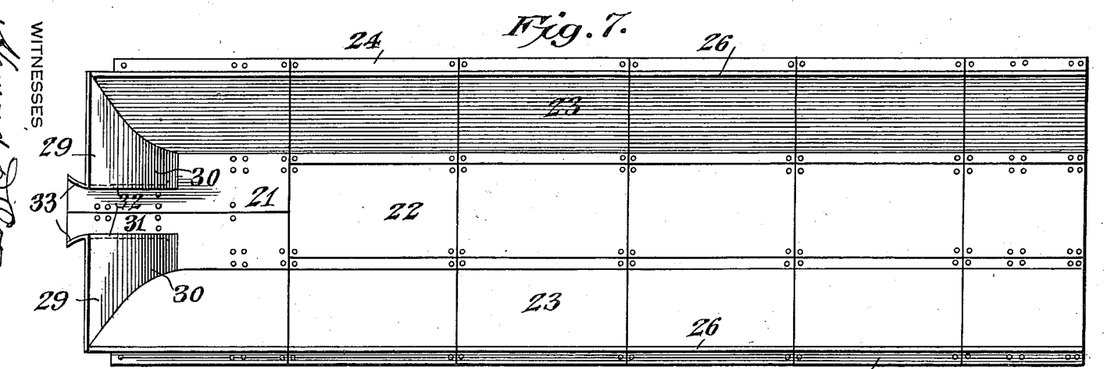
Fig. 7 is a plan view of the platform.
Figure 8:
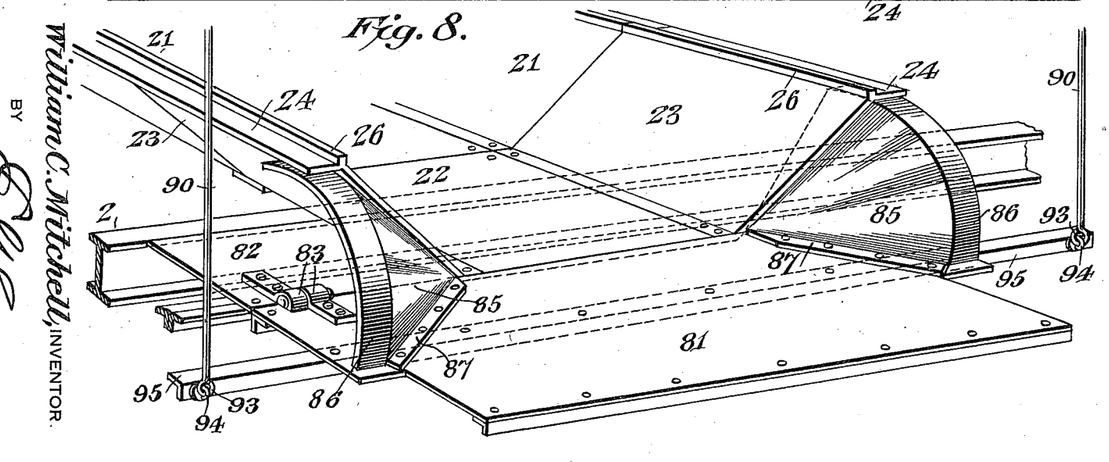
Fig. 8 is a detail perspective view of the front end of the platform, illustrating the construction of the extension device.
Figure 10:
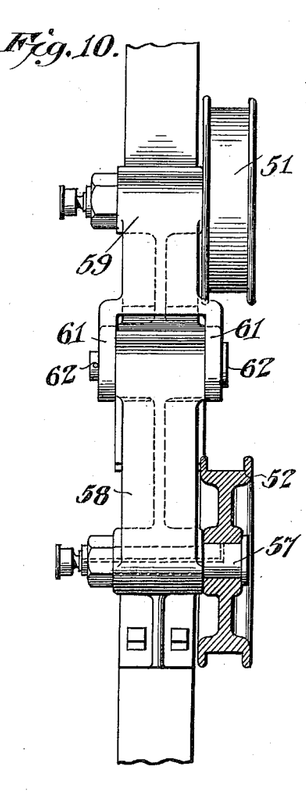
Fig. 10 is a detail view of the chain tightener.

The platform is provided with an inner or rear end wall 29, composed of spaced sections arranged at an inclination and having their lower portions 30 curved downwardly and forwardly to the bottom of the platform. The sections of the inner end wall are spaced apart to form a coke-receiving opening 31, and the platform is provided at opposite sides of the opening with upright plates 32, suitably secured to the sections of the end wall 29 at the inner edges of the said sections and coöperating with extensions 33 of the bottom of the platform to form a projecting mouth, which is slightly flared at the sides, as clearly illustrated in Fig. 7 of the drawings.

The charge of coke from the coke oven is delivered onto the platform at the inner end thereof in an incandescent state by means of a ram (not shown), or any other suitable mechanical means, and after being quenched is swept or carried along the platform to the front end thereof and discharged into a car 34 by means of a transversely disposed conveyer member 35. The coke may, of course, be quenched after it is discharged into the cars, but it is preferable to perform this operation while the coke is upon the platform of the machine, and as the means for quenching the coke does not constitute a portion of the present invention, illustration thereof is deemed unnecessary.

Figure 3:
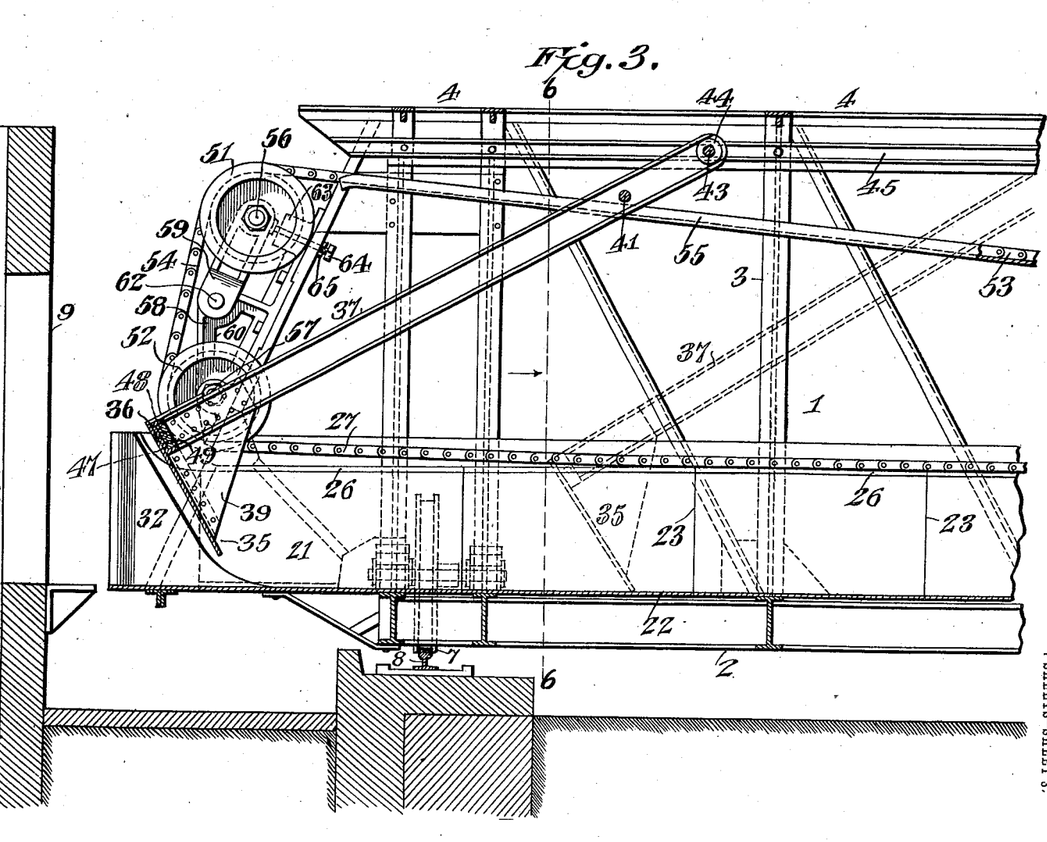
Fig. 3 is a central longitudinal sectional view of the rear end of the apparatus.
Figure 5:
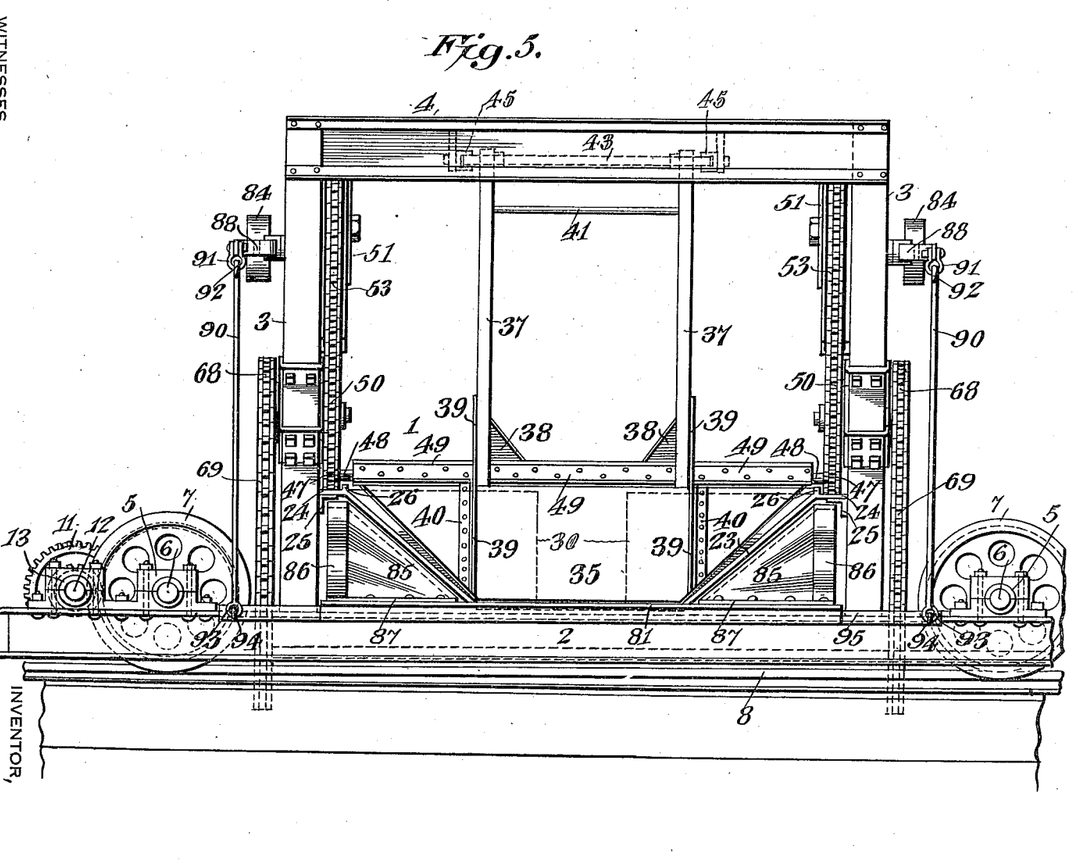
Fig. 5 is a front elevation of the coke handling apparatus.
Figure 6:
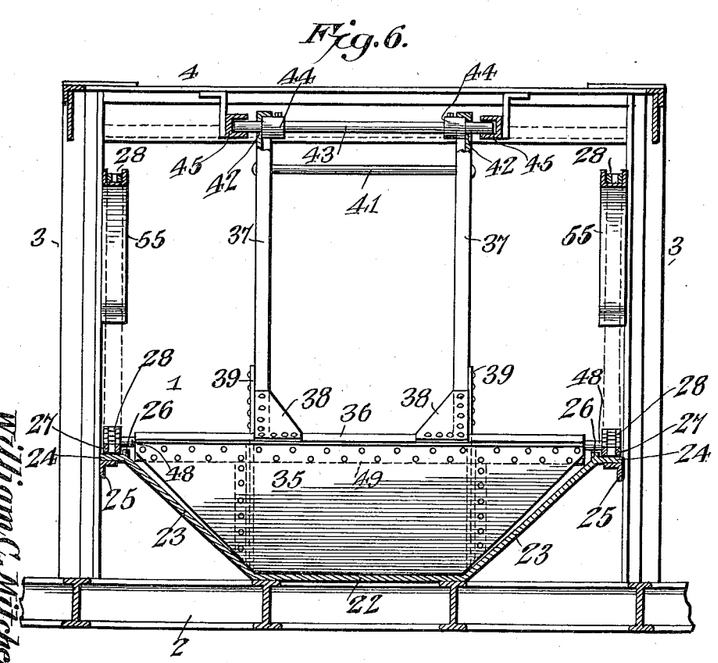
Fig. 6 is a transverse sectional view, taken substantially on the line 6—6 of Fig. 3, the conveyer member or scraper being in its lowermost position.

The transversely disposed conveyer member 35, which may be constructed of any suitable material, is preferably in the form of a scraper, but a rake or other analogous conveyer member may be employed if desired. The conveyer member or scraper 35 is tapered downwardly to conform to the configuration of the platform, and it is moved along the same from the inner or rear end thereof to the outer or front end of the platform in an inclined position. It extends downwardly and forwardly and is adapted to direct or skid the coke, or other material into the car. In practice the scraper will rest upon the platform during its forward or outward movement in order to carry the entire charge of coke into the car, or other receptacle. The upper portion of the scraper is fitted flat against a transversely disposed channel bar 36 and is suitably secured to the same. The channel bar is connected to and carried by the lower ends of downwardly and rearwardly inclined suspension bars 37, preferably consisting of channels and secured to the scraper at points intermediate of the ends of the transverse channel by means of gussets 38 and 39. The bars 37 form upwardly and forwardly extending inclined arms, and the gussets 38, which consist of triangular plates, are disposed transversely and are secured to the rear edges or faces of the inclined bars 37 and the transversely disposed channel bar 36. The other gussets 39, which are approximately triangular, are arranged in upright planes and are secured to the outer side faces of the suspension bars 37 and to the front face of the scraper 35, angle strips 40 being preferably employed for the attachment of the gussets to the scraper, one flange of the angle strip 40 being riveted to the gusset 39 and the other being similarly secured to the scraper, as clearly indicated in Figs. 3 and 5 of the drawings.

Figure 4:
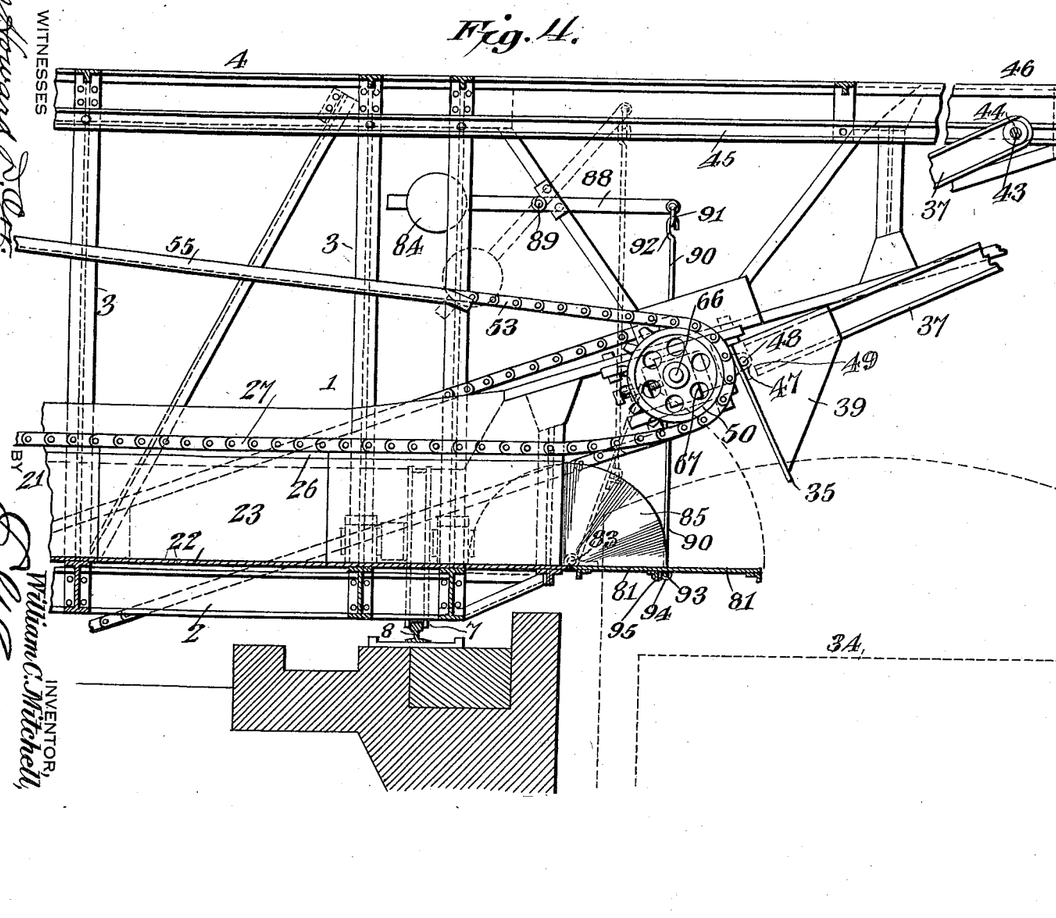
Fig. 4 is a similar view of the outer or front end of the apparatus.

The inclined connecting or suspension bars or members 37 are preferably located in the vertical planes of the angles formed by the horizontal bottom and inclined sides of the platform, but they may be secured to the scraper at any other preferred point, and they are connected adjacent to the upper ends by a transverse rod 41, and are provided at their upper terminals with bearing openings 42 for the reception of a transverse pivot 43, extending across the space between the upper ends of the bars 37 and projecting laterally therefrom. The upper ends of the bars 37 are held against movement along the pivot 43 by collars or bearing sleeves 44, or other suitable means, and the laterally projecting ends of the pivot 43 operate in horizontal guides 45, preferably consisting of channel bars, extending longitudinally of the top of the frame of the apparatus from the inner or rear end of the same to the front or outer end thereof. The top of the frame and the upper portions of the sides are extended at the front to form a projecting or overhanging front top portion 46. The extended front of the top of the frame supports the front portions of the horizontal guides 45, which extend outwardly a sufficient distance to accommodate the upper front ends of the bars 37 to permit the scraper to be carried to the extreme front of the platform, as clearly illustrated in Fig. 4 of the drawings. The transverse pivot 43 constitutes a reciprocatory cross head, which slidably connects the upper terminals of the supporting bars 37 and causes the same to transfer the frame from one end to the other during the operation of the scraper, and at the same time pivotally connects the upper ends of the bars 37 to the frame and permits the scraper to swing upwardly and downwardly, whereby the scraper is adapted to be pulled or drawn forwardly along the platform and in contact with or close proximity to the bottom thereof during its outward movement, and is also adapted to be lifted clear of the platform, and elevated at a sufficient height to pass over a charge of coke during its inward or rearward movement. The ends of the transverse pivot 43 may, if desired, be equipped with any suitable antifriction devices to reduce the friction incident to the sliding of the ends of the pivot in the longitudinal guides or ways 45.

The scraper, which is carried forwardly and rearwardly by the endless chains 28, is connected with bearing links 47 thereof by means of pivots or trunnions 48, preferably formed integral with a pivot or filler bar 49, arranged within the groove or channel of the transverse bar 36 and suitably secured to the same. The pivots 48 are suitably secured in the bearing links 47, and the endless chains 28, which are located at opposite sides of the frame of the apparatus, are arranged on front sprocket wheels 50 and on rear upper and lower idler pulleys or sheaves 51 and 52, and consisting of the said lower horizontal bottom flight 27, an upper inclined flight 53, and a rear connecting flight 54. The lower horizontal flight 27 travels forwardly in the grooves or ways formed by the supporting flanges 24, and the upper inclined flights 53 of the chains move rearwardly and are supported by inclined guides 55, preferably consisting of channel bars suitably secured to the sides of the frame and extending from the front to the rear portion thereof, as clearly shown in Figs. 3 and 4 of the drawings. The lower forwardly moving bottom flights 27 of the chains cause the scraper to move forwardly along the platform and sweep the contents thereof into the car 34, or other receptacle and when the scraper arrives at the front of the apparatus the bearing links 47 pass upwardly over the sprocket wheels 50, and the scraper is carried upwardly and rearwardly by the rearwardly moving inclined upper flights of the chains, and is elevated sufficiently to clear a charge of coke or other material. The scraper on arriving at the inner or rear end of the frame is carried downwardly by the rear flights 54 to the bottom of the platform, where it is in position for another operation.

The upper and lower rear pulleys or sheaves 51 and 52 of each sprocket chain are mounted on short shafts 56 and 57, journaled in suitable bearings of a bracket 58 and an adjustable link 59, which is adapted to be moved outwardly to tighten the chain. The bracket 58, which is secured to the rear end of the frame in an inclined position, is provided with a lower triangular portion 60, and the link 59, which is arranged at a slight inclination, has its lower end 61 forked or bifurcated to straddle the bracket, and it is pivoted to the triangular portion 60 at the upper outer corner thereof by a pin 62, or other suitable fastening device. The shaft 56 is journaled in and carried by the upper end of the link 59, and the upper portion of the bracket is provided with an outwardly projecting stud 63, having a threaded opening for the reception of an adjusting screw 64, adapted to force the link outwardly and secured in its adjustment by a lock nut 65. The shaft 57 upon which the lower pulley or sheave is mounted is journaled in a suitable bearing at the lower end of the bracket 58.

Figures 1, 9:
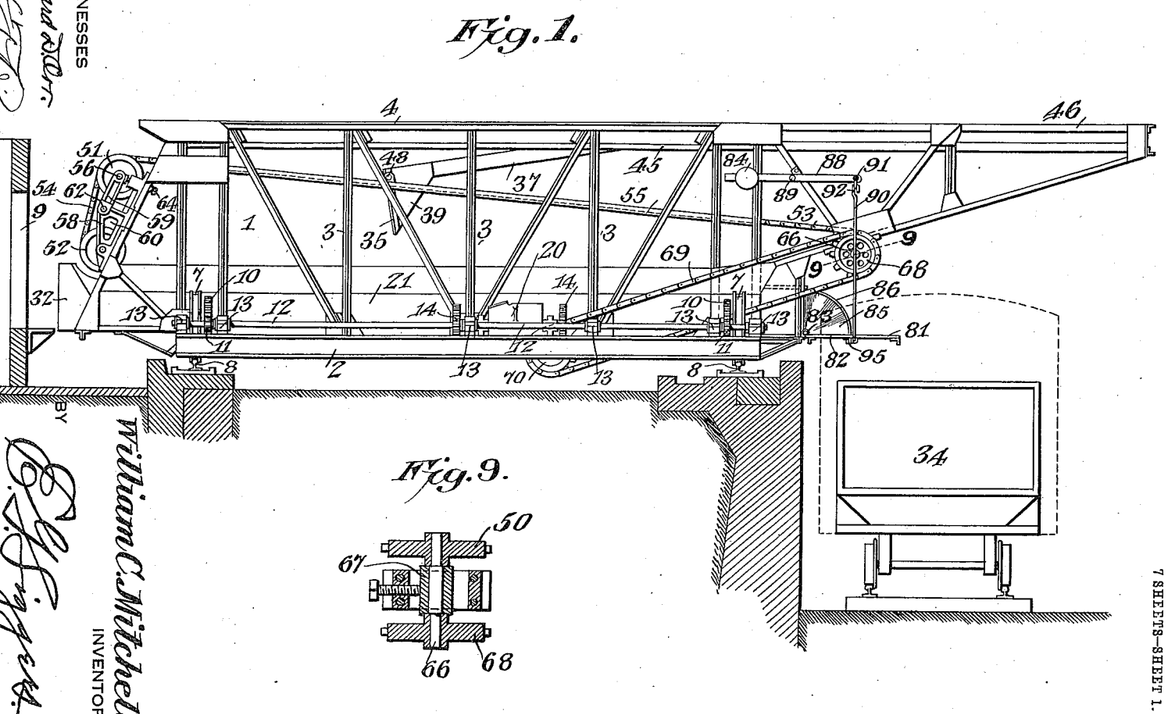
—Figure 1 is a side elevation of a coke handling apparatus, constructed in accordance with this invention.
Fig. 9 is a detail sectional view, taken substantially on the line 9—9 of Fig. 1.
Figure 2:
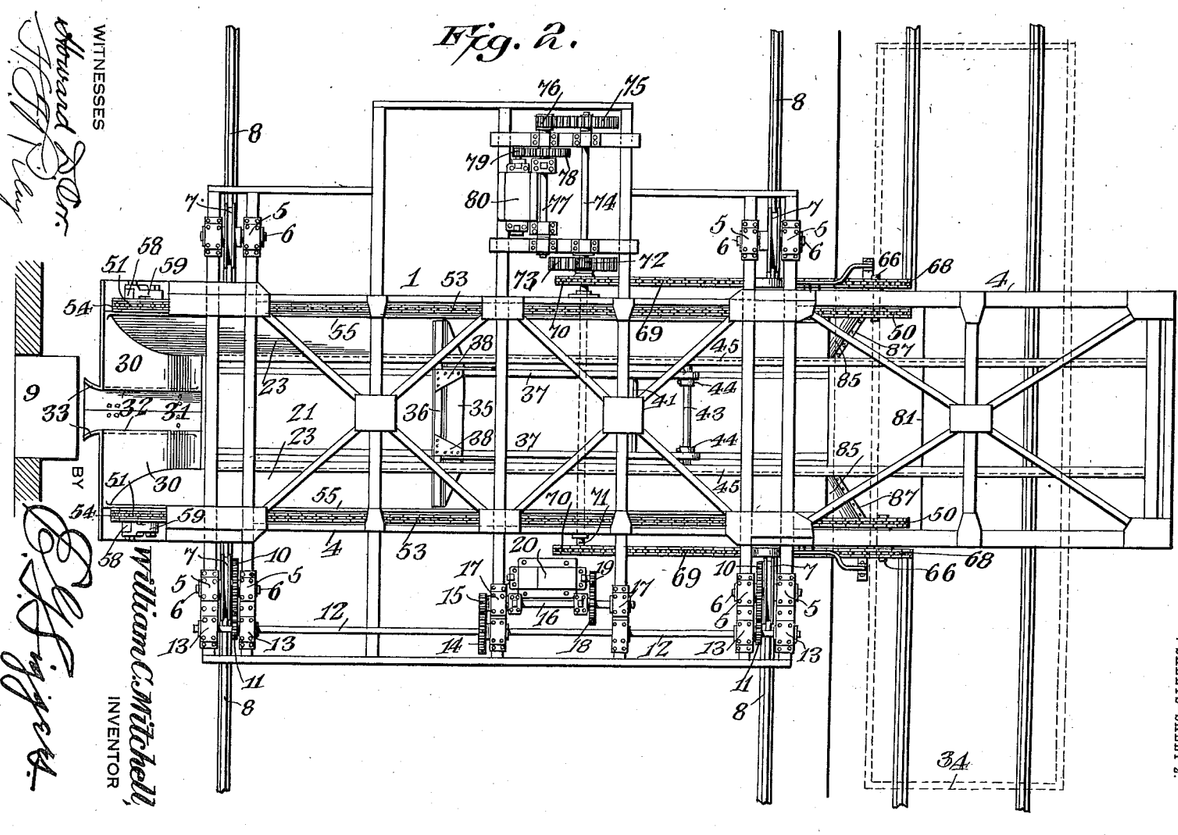
Fig. 2 is a plan view of the same.

The front sprocket wheels, which mesh with and actuate the endless sprocket chains, are mounted on short transverse shafts 66, journaled in adjustable bearings 67 and carrying outer sprocket wheels 68, which are connected by longitudinal sprocket chains 69 with sprocket wheels 70 of a transverse shaft 71, journaled in suitable bearings of the frame of the apparatus and located beneath the platform thereof. The chain 69 and the sprocket wheels 66 and 70 are located at both sides of the platform, as clearly shown in Fig. 2 of the drawings, and one end of the central transverse shaft 71 is provided with a spur pinion 72, located at the outer side of the adjacent sprocket wheel 70 and meshing with a spur gear wheel 73 of an outer laterally off-set transverse shaft 74. The spur pinion 72 is arranged at the inner end of the transverse shaft 74, which is journaled in suitable bearings of the frame, and the spur gear 75 is keyed or otherwise secured to the outer end of the shaft 74. The spur gear 75 meshes with a pinion 76 of a counter shaft 77, carrying a spur gear 78, which meshes with a spur pinion 79 of an electric motor 80. Any other form of motive power may of course be employed for operating the scraper. The gearing, which connects the motor with the scraper, reduces the speed and increases the power sufficiently to actuate the scraper. Any other preferred arrangement of gearing may of course be employed for transmitting motion from a motor to the scraper.

In order to enable the charge of material to be delivered into the car 34 at approximately the middle thereof to prevent the coke from spilling at the sides of the car, vessel, or other receptacle, the platform is equipped at its front end with an extensible device consisting of a hinged section 81, constructed of suitable material and extending across the front of the platform and projecting laterally beyond the bottom 22, which is provided with fixed lateral extensions 82 to which the side portions of the sections 81 are connected by hinges 83, located at the inner transverse edge of the section 81. The section 81, which forms a closure for the outer end of the platform, is adapted to swing upwardly and downwardly, and it is moved downwardly from an upright position by the charge of coke, or other material as the same is swept off the platform by the scraper, and the said hinged section is automatically swung upwardly and returned to its initial position within the apparatus by means of counter weights 84. The hinges 83 may be of any preferred construction, and in order to prevent any material, which may remain on the hinged section 81 escaping at the sides thereof and getting in rear of the inclined sides 23 of the platform, the hinged section is provided at opposite sides with conical side members 85, tapered transversely of the platform and curved longitudinally thereof and adapted to fit snugly against the front ends of the inclined sides of the bottom and to move beneath the same when the hinged section 81 is swung upward, whereby the spaces between the hinged section and the inclined sides of the platform are closed to prevent the escape of the material at those points. The conical side members are provided at their outer side edges with arcuate flanges or portions 86, which fit against the lower faces of the laterally extending flanges 24 and move beneath the same. The tapered or conical side members are provided with attaching flanges 87, located at their front edges and secured to the upper face of the hinged section 81. By means of the hinged section and the side members, loss of coke or other material is prevented both during the discharge of the material from the platform and during the upward or closing movement of the hinged section.

The counter weights 84, which automatically close the hinged section or extension 81 of the platform, are mounted upon the inner arms of longitudinally disposed levers 88, fulcrumed at an intermediate point at 89 on the same and connected at their outer ends with the hinged section 81 by means of rods 90, or other suitable connections. The outer or front ends of the levers 88 are preferably equipped with shackles 91 to receive the upper hooked terminals 92 of the rods, and the lower ends of the latter are provided with eyes 93, which are linked into eyes 94 of a transversely disposed angle bar 95, secured to the lower face of the hinged section 81 and projecting from the sides thereof to form laterally extending arms. The counter weights 84 are preferably adjustable and exert sufficient force to swing the extension device upwardly to its initial position, whereby the hinged section is normally maintained clear of a locomotive, box cars, vessels, and the like. By this construction efficient means for bridging or spanning the space between the platform and the car, or other receptacle is provided while the charge of coke, or other material is being delivered to such car or vessel, and the bridging or spanning means is automatically withdrawn at the competition of each discharge of the apparatus.

Having thus fully described my invention, what I claim as new and desire to secure by Letters Patent, is:—

1. An apparatus for handling coke, etc., including a platform, a conveyer member extending across the platform and arranged to sweep or carry the material along the same, an endless chain or belt disposed longitudinally of the platform and connected with and actuating the conveyer and having a portion to move the conveyer continuously along the platform from one end to the other thereof, and another portion for elevating the conveyer member above the platform at the discharge end thereof.

2. An apparatus for handling coke, etc., including a platform, a conveyer member extending across the platform and arranged to sweep or carry the material along the same, and an endless chain or belt connected with the conveyer member and having a forwardly moving lower flight extending the length of the platform and arranged to move the conveyer member continuously along the platform, and a rearwardly moving upper inclined flight adapted to lift the conveyer member at the discharge end of the platform and carry the same into an elevated position back to the inner end of the platform.

3. An apparatus for handling coke, etc., including a frame having a platform, a conveyer member arranged transversely of the platform, means for slidably and pivotally connecting the conveyer member with the frame, and an endless chain or belt connected with the conveyer member and having a portion arranged to move the conveyer member continuously along the platform from the rear to the front end of the same to sweep the material from the platform, said chain or belt being also provided with a rearwardly moving portion arranged to lift the conveyer member at the discharge end of the platform and carry the same in an elevated position back to the inner end of the platform.

4. An apparatus for handling coke, etc., including a frame having a platform, a conveyer member arranged transversely of the platform, means for slidably and pivotally connecting the conveyer member with the frame, and an endless chain or belt connected with the conveyer member and having a portion arranged to move the conveyer member forwardly along the platform to sweep the material therefrom, said chain or belt being also provided with a rearwardly moving inclined portion arranged to carry the conveyer member backwardly in an elevated position above the platform.

5. An apparatus for handling coke, etc., comprising a frame having a platform, a conveyer member arranged transversely of the platform, means for slidably and pivotally connecting the conveyer member with the frame, and an endless chain or belt connected with the platform and including a forwardly moving lower flight arranged to move the conveyer member along the platform, and a rearwardly moving upper inclined flight adapted to carry the conveyer member rearwardly in an elevated position to return the conveyer member to the inner portion of the platform.

6. An apparatus for handling coke, etc., comprising a frame having a platform, a conveyer member disposed transversely of the platform, means for slidably and pivotally connecting the conveyer member with the frame, spaced endless chains or belts located at opposite sides of the platform and connected with the conveyer member and including lower flights arranged to move the conveyer member forwardly along the platform, and upper rearwardly moving flights arranged to carry the conveyer member rearwardly in an elevated position above the platform.

7. An apparatus for handling coke, etc., comprising a frame having a platform, a conveyer member disposed transversely of the platform, means for slidably and pivotally connecting the conveyer member with the frame, and an endless chain or belt connected with the conveyer member and including a lower forwardly moving bottom flight to carry the conveyer member along the platform, an upper rearwardly moving inclined flight to carry the conveyer member rearwardly in an elevated position, and a downwardly moving rear flight adapted to return the conveyer member to the platform.

8. An apparatus for handling coke, etc., comprising a frame having a platform, a conveyer member extending across the platform, means for slidably and pivotally connecting the conveyer member with the frame at a point above the platform, and an endless chain or belt connected with the conveyer member at a point below the pivot thereof and including a lower forwardly moving flight to carry the conveyer member along the platform, and an upper rearwardly moving flight to return the said member to the inner portion of the platform.

9. An apparatus for handling coke, etc., comprising a frame having a longitudinal guide, a conveyer member extending across the platform and provided with a pivot operating in the guide or way, and actuating means connected with the conveyer member at a point between the pivot and the platform for moving the conveyer member forwardly along the platform and rearwardly to return the conveyer member to the inner portion of the platform.

10. An apparatus for handling coke, etc., comprising a frame having a longitudinal guide, a conveyer member extending across the platform and provided with a pivot operating in the guide or way, and actuating means connected with the conveyer member at a point below the pivot thereof for moving the conveyer member forwardly along the platform and for elevating the conveyer member to return the same in an elevated position to the inner portion of the platform.

11. An apparatus for handling coke, etc., comprising a frame having a longitudinal guide, a conveyer member extending across the platform and provided with a pivot operating in the guide or way, and an endless chain or belt connected with the conveyer member at a point below the pivot thereof and including a forwardly moving lower flight arranged to move the conveyer member forwardly along the platform, and an upper rearwardly moving flight for returning the conveyer member to the inner portion of the platform.

12. An apparatus for handling coke, etc., comprising a frame provided with an overhead longitudinal guide and having a platform located below the plane of the guide, a conveyer member extending across the platform and provided with an upwardly extending arm having a pivot operating in the said guide, and an endless chain or belt connected with the conveyer member at the lower end of the arm and including a forwardly moving lower flight arranged to carry the conveyer member along the platform, and an upper rearwardly moving flight adapted to elevate the conveyer member and return the same in an elevated position to the inner portion of the platform.

13. An apparatus for handling coke, etc., comprising a frame provided with spaced over-head longitudinal guides and having a platform located below the plane of the guides, a conveyer member extending across the platform and having an upwardly extending arm, a pivot connected with the arm and operating in the guides, and spaced endless chains or belts located at opposite sides of the platform and connected with the conveyer member and having lower and upper flights arranged to carry the conveyer member along the platform and return the same in an elevated position to the inner portion of the platform.

14. An apparatus for handling coke, etc., comprising a frame provided with spaced over-head longitudinal guides and having a platform located below the guides, a conveyer member extending across the platform and provided at opposite sides with pivots and having upwardly extending arms located at points intermediate of the said pivots, endless chains or belts located at opposite sides of the platform in spaced relation with bearings receiving the pivots of the conveyer member, and a pivot connected with the upper ends of the arms and operating in the longitudinal guides or ways.

15. An apparatus for handling coke, etc., comprising a frame having a platform, a conveyer member extending across the platform, spaced endless sprocket chains connected with the conveyer member and including a lower flight arranged to move the conveyer member along the platform, an upper inclined flight adapted to elevate and carry the conveyer member rearwardly, and a rear downwardly moving flight for returning the conveyer member to the platform, front sprocket wheels meshing with the chains, rear idlers receiving the said chains, sprocket gearing located at opposite sides of the platform and connected with the front sprocket wheels, and motor actuated gearing connected with the spaced sprocket gearing.

16. An apparatus for handling coke, etc., comprising a frame having a platform, a conveyer member including a scraper extending across the platform, a transverse channel bar secured to the scraper, a pivot or filler bar arranged in the channel of said bar and having terminal pivots projecting from the conveyer member, arms extending upwardly from the transverse channel bar, transverse gusset plates connecting the arms with the channel, upright gusset plates connecting the arms with the scraper, means for pivotally and slidably connecting the arms with the frame, and spaced endless chains having bearings receiving the projecting pivots of the conveyer member.

17. An apparatus for handling coke, etc., comprising a trough-shaped platform provided at opposite sides with supporting flanges having longitudinal ribs forming grooves or ways, a conveyer member extending across the platform, and endless chains or belts connected with the conveyer member and having flights or portions operating in the grooves or ways of the platform.

18. An apparatus for handling coke, etc., comprising a frame, a trough-shaped platform carried by the frame and provided at opposite sides with longitudinal supporting flanges, a conveyer member extending across the platform, endless chains or belts connected with the conveyer member and including lower forwardly moving flights supported by the flanges of the platform and upper rearwardly moving flights, and guides mounted on the frame and receiving and supporting the upper flights of the chains or belts.

19. An apparatus for handling coke, etc., provided with a trough-shaped platform including a horizontal bottom, inclined sides, an inner end wall consisting of spaced sections connected with the bottom and with the sides of the platform, and spaced rearwardly projecting plates connected with the inner edges of the said sections and with the bottom, the latter being provided with extensions coöperating with the said plates to form a mouth.

20. An apparatus for handling coke, etc., provided with a trough-shaped platform including a horizontal bottom, inclined sides, an inner end wall consisting of spaced inclined sections connected with the sides of the platform and the bottom thereof, spaced upright plates secured to the inner edges of the said sections and to the bottom, the latter and the plates being extended to form a projecting mouth and the rear portions of the plates being flared.

21. An apparatus for handling coke, etc., including a platform, means movable along the platform for sweeping or raking the material therefrom, and an automatically closable extension device arranged at the discharge end of the platform for bridging the space between the same and a car or other receptacle and adapted to be opened by the material when the same is discharged from the platform.

22. An apparatus for handling coke, etc., including a platform, means movable along the platform for sweeping or raking the material therefrom, a hinged section arranged at the discharge end of the platform and adapted to form an extension thereof to bridge the space between the same and the car or other receptacle, and yieldable means for automatically swinging the hinged section inwardly within the apparatus, said section being adapted to be swung outward automatically by the material as it is discharged from the platform.

23. An apparatus for handling coke, etc., including a platform, a hinged section arranged at the discharge end of the platform and adapted to be swung outwardly by the material as the same is discharged from the platform, a lever connected with the hinged section, and a counter-weight carried by the lever for automatically swinging the hinged section inwardly, said weight yieldably maintaining the hinged section at the inward limit of its movement, whereby the hinged section is adapted to be swung outward automatically by the material as the same is discharged from the platform.

24. An apparatus for handling coke, etc., including a platform, an extension section hinged at the discharge end of the platform and arranged to swing inwardly and outwardly and adapted to bridge the space between the platform and a car or other receptacle, spaced levers provided with counter-weights, and connections between the levers and the hinged section, the latter being adapted to be moved outward by the material as the same is discharged from the platform and being automatically swung inwardly by the weight of the levers.

25. An apparatus for handling coke, etc., including a trough-shaped platform having inclined sides, and a hinged section arranged at the discharge end of the platform and provided with tapering side members closing the space between the hinged section and the inclined sides of the platform.

26. An apparatus for handling coke, etc., including a trough-shaped platform having inclined sides, and a hinged section arranged at the discharge end of the platform and provided with approximately conical side members tapered transversely of the platform and curved longitudinally thereof and fitting the inclined sides of the same and movable beneath the said sides when the hinged section is swung upward.

27. An apparatus for handling coke, etc., including a trough-shaped platform having inclined sides provided with laterally projecting horizontal flanges, a hinged section arranged at the end of the platform and adapted to form an extension thereof, and conical side members carried by the hinged section and tapered inwardly and fitting the inclined sides of the platform and provided with outer arcuate flanges movable beneath the horizontal flanges of the platform.

28. An apparatus for handling coke, etc., including a trough-shaped platform, an extension section arranged at the outer end of the platform for bridging the space between the same and a car or other receptacle, approximately conical side members carried by the extension section and fitting against the sides of the platform for closing the space between the same and the extension section, and hinges connected with the said section and located in rear of the side members.

29. An apparatus for handling coke, etc., including a platform having inclined sides, an extension section provided at opposite sides with conical members for closing the space between the extension section and the sides of the platform, said extension section being also provided with hinges located in rear of the side members, arms extending laterally from the extension section, and over-head weighted levers connected with the arms for automatically swinging the extension section upward to close the outer end of the platform.

30. An apparatus for handling coke, etc., including a relatively fixed trough-shaped platform, a conveyer member movable along the platform for sweeping the material therefrom, and a hinged closure located at the outer end of the platform and adapted to be opened by the material.

31. An apparatus for handling coke, etc., including a trough-shaped platform, a conveyer member movable along the platform for sweeping the material therefrom, a closure located at the outer end of the platform and hinged at the bottom and adapted to be opened by the material and arranged to form an extension of the platform.

32. An apparatus for handling coke, etc., including a platform, a conveyer member, an endless chain connected with the conveyer member for moving the same along the platform, a bracket having a projecting portion, an arm pivoted to the projecting portion of the bracket, wheels receiving the chain and mounted on the bracket and on the said arm, and an adjusting device mounted on the bracket for forcing the arm outwardly to tighten the chain.

33. An apparatus for handling coke, etc., including a laterally movable frame having a platform, transversely disposed supporting wheels provided with short longitudinally arranged axles journaled in bearings of the frame, gear wheels mounted on the axles at one side of the frame, a longitudinal shaft mounted on the shaft at such side thereof and having gears meshing with the said gear wheels, a motor carried by the frame, and gearing connecting the motor with the longitudinal shaft.

34. An apparatus for handling coke, etc., including a frame, a platform carried by the frame and provided at its inner end with an inclined wall having an entrance opening, a conveyer member arranged transversely of the platform, and an actuating chain or belt connected with the conveyer member and consisting of a lower forwardly moving flight to carry the conveyer along the platform, an upper rearwardly moving flight to return the conveyer member to the inner portion of the platform, and a downwardly moving rear flight located above the inclined wall of the platform for returning the conveyer member to the latter.

35. An apparatus for handling coke, etc., including a frame having a platform, a fixed longitudinal guide located above the platform, a conveyer member pivotally hung from and movable along the guide, and actuating means connected with the conveyer member for moving the same forwardly along the platform and for returning it to the inner end thereof.

36. An apparatus for handling coke, etc., including a frame having a platform, a fixed longitudinal guide located above the platform, a conveyer member pivotally hung from and movable along the guide, and actuating means connected with the conveyer member for moving the same longitudinally of the platform to a point beyond the same and for elevating the conveyer member and returning the same in an elevated position to the inner portion of the platform.

37. An apparatus for handling coke, etc., comprising a trough-shaped platform provided at opposite sides with guides or ways, endless chains or belts located at each side of the platform and operating in the guides or ways, and a conveyer member extending across the platform and connected with the endless chains or belts and carried by the same.

38. An apparatus for handling coke, etc., comprising a trough-shaped platform having inclined sides and provided at the top thereof with guides or ways, endless chains or belts located at each side of the platform and operating in the guides or ways, and a conveyer member extending across the platform and conforming substantially to the cross sectional configuration of the same and connected with and carried by the endless chains or belts.

In testimony that I claim the foregoing as my own, I have hereto affixed my signature in the presence of two witnesses.

WILLIAM C. MITCHELL.

Witnesses:
EDWIN E. SHAW,
J. C. MACKLEY.

---

Copies of this patent may be obtained for five cents each, by addressing the "Commissioner of Patents, Washington, D. C."